United States Patent
Chamarty et al.

(10) Patent No.: US 10,642,337 B2
(45) Date of Patent: May 5, 2020

(54) ACTIVE POWER MANAGEMENT IN A COMPUTING DEVICE SUBSYSTEM BASED ON MICRO-IDLE DURATION

(71) Applicant: QUALCOMM INCORPORATED, San Diego, CA (US)

(72) Inventors: Vinod Chamarty, San Diego, CA (US); Trang Nguyen, San Diego, CA (US); Edwin Jose, San Diego, CA (US); Xin Kang, San Diego, CA (US); Sean Sweeney, Firestone, CO (US); Michael Drop, La Mesa, CA (US); Boris Andreev, San Diego, CA (US); Farrukh Aquil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 380 days.

(21) Appl. No.: 15/668,554

(22) Filed: Aug. 3, 2017

(65) Prior Publication Data

US 2019/0041941 A1    Feb. 7, 2019

(51) Int. Cl.
| | |
|---|---|
| *G06F 1/324* | (2019.01) |
| *G06F 1/3234* | (2019.01) |
| *G06F 1/3206* | (2019.01) |
| *G06F 1/3225* | (2019.01) |
| *G06F 1/3237* | (2019.01) |
| *H04W 52/02* | (2009.01) |
| *G06F 1/3287* | (2019.01) |

(52) U.S. Cl.
CPC ............ *G06F 1/324* (2013.01); *G06F 1/3206* (2013.01); *G06F 1/3225* (2013.01); *G06F 1/3237* (2013.01); *G06F 1/3275* (2013.01); *H04W 52/029* (2013.01); *G06F 1/3287* (2013.01); *H04W 52/0209* (2013.01)

(58) Field of Classification Search
CPC .... G06F 1/3206; G06F 1/3225; G06F 1/3237; G06F 1/324; G06F 1/3275; G06F 1/3287; H04W 52/0209; H04W 52/029
See application file for complete search history.

(56) References Cited

U.S. PATENT DOCUMENTS

| | | | |
|---|---|---|---|
| 9,665,153 B2 * | 5/2017 | Ramani | G06F 1/3296 |
| 2014/0189403 A1 * | 7/2014 | Gorbatov | G06F 1/3206 |
| | | | 713/323 |

(Continued)

OTHER PUBLICATIONS

International Search Report and Written Opinion—PCT/US2018/034454—ISA/EPO—dated Aug. 20, 2018.

*Primary Examiner* — Terrell S Johnson
(74) *Attorney, Agent, or Firm* — Smith Tempel Blaha LLC

(57) ABSTRACT

Micro-idle power in a subsystem of a portable computing device may be actively managed based on client voting. Each client vote may include a client activity status indication and a client latency tolerance indication. Votes are aggregated to provide an aggregate client latency tolerance, which may be used to obtain a set of micro-idle time values. Micro-idle timers in the subsystem may be set to associated micro-idle time values. The micro-idle timers determine whether one or more of the micro-idle time values have elapsed. A power management policy associated with each micro-idle time value determined to have elapsed may be applied to a portion of the subsystem.

30 Claims, 6 Drawing Sheets

(56) References Cited

U.S. PATENT DOCUMENTS

| | | | |
|---|---|---|---|
| 2015/0006923 A1* | 1/2015 | Cooper | G06F 1/3206 713/320 |
| 2017/0052584 A1* | 2/2017 | Patil | G11C 7/1057 |
| 2017/0068308 A1* | 3/2017 | Park | G06F 1/3296 |
| 2017/0212581 A1 | 7/2017 | Park et al. | |

* cited by examiner

| ALC | MICRO-IDLE TIMERS | | | ... | |
| --- | --- | --- | --- | --- | --- |
| | 1ST TIMER | 2ND TIMER | 3RD TIMER | ... | NTH TIMER |
| 0 | | | | ... | |
| 1 | | | | ... | |
| 2 | | | | ... | |
| ⋮ | ⋮ | ⋮ | ⋮ | ⋮ | ⋮ |
| 15 | | | | ... | |

ACTIVE POWER MANAGEMENT IN A COMPUTING DEVICE SUBSYSTEM BASED ON MICRO-IDLE DURATION

DESCRIPTION OF THE RELATED ART

Portable computing devices ("PCDs") are becoming necessities for people on personal and professional levels. These devices may include cellular telephones, portable digital assistants, portable game consoles, palmtop computers, and other portable electronic elements.

A PCD has various electronic subsystems and components that consume power, such as one or more cores of a system-on-chip ("SoC"). SoC cores may include, for example, central processing units ("CPUs"), graphics processing units ("GPUs"), and digital signal processors ("DSPs"). Memory subsystems, such as a double data-rate dynamic random access memory ("DDR-DRAM" or "DDR") subsystem, similarly consume power.

Dynamic clock and voltage scaling ("DCVS") techniques have been developed to balance system performance with power consumption. In some PCDs, each component sharing a voltage rail and/or a clock domain may issue a message, commonly referred to as a "vote," indicating a desired power state, such as a desired voltage level and/or clock frequency. A resource power manager ("RPM") may aggregate the votes and determine a voltage level or clock frequency to which the shared voltage rail or clock signal is to be adjusted. A component that anticipates becoming idle for a period of time may vote for an idle state, represented by a low or "collapsed" voltage level and a clock frequency of zero. The RPM may select any of a number of power states, ranging from an idle state to a high-performance state, each defined by a combination of voltage level and operating frequency.

The RPM may set a memory subsystem to an idle state if all memory subsystem clients vote for an idle state. Only relatively infrequently do all memory subsystem clients vote for an idle state because some may be unaware of a break in memory traffic. Also, in some instances the RPM may not set the memory subsystem to an idle state because the anticipated break in traffic is shorter than a threshold amount of time.

During a time period in which the RPM allows the memory subsystem to remain in an active state (i.e., not an idle state) the memory subsystem may nonetheless adjust its power consumption in response to smaller time periods during which it is idle. The latter time periods may be referred to as "micro-idle" periods, in contrast with a "macro-idle" time period during which the memory subsystem is placed in an idle state in response to a vote aggregation by the RPM. The memory subsystem may determine that it is experiencing a micro-idle state if no memory traffic occurs for a predetermined amount of time. In response to determining that it is in a micro-idle state, the memory subsystem may take measures to reduce power consumption, such as turning off one or more of its circuitry blocks, gating one or more of its internal clock signals, etc. The predetermined amount of time that defines a micro-idle state and the measures that the memory subsystem may take to reduce power consumption may be defined or selected at the time the PCD is initialized, e.g., at boot-up time. Each of the possible power management measures or policies has an associated exit latency penalty; generally, the deeper the power reduction state, the longer the exit latency penalty. The PCD may select (e.g., at initialization time) the predetermined amount of time that defines a micro-idle state and which of the power management policies is to be applied upon entry into a micro-idle state based on data that the PCD has collected during previous periods of operation. The amount of time that defines a micro-idle state and which of the power management policies is to be applied upon entry into a micro-idle state remain fixed until such time as the PCD is again initialized.

SUMMARY OF THE DISCLOSURE

Systems, methods, and computer program products for power management in a subsystem of a portable computing device are disclosed.

In one aspect, a method for power management in a subsystem of a portable computing device may include receiving a plurality of votes from a corresponding plurality of client devices of the subsystem, and providing an aggregate client latency tolerance in response to the plurality of votes. Each vote may include a client activity status indication and a client latency tolerance indication. The aggregate client latency tolerance may correspond to a plurality of micro-idle time values associated with a corresponding plurality of micro-idle timers. The method may further include setting each of the micro-idle timers to an associated micro-idle time value in response to the aggregate client latency tolerance. The method may also include determining, using the micro-idle timers, whether one or more of the micro-idle time values have elapsed, and applying to a portion of the subsystem a corresponding power management policy associated with each micro-idle time value determined to have elapsed.

In another aspect, a system for power management in a subsystem of a portable computing device may include a resource power manager ("RPM"), an aggregator, and a plurality of micro-idle timers. The RPM may be configured to receive a plurality of votes from a corresponding plurality of client devices of the subsystem. Each vote may include a client activity status indication and a client latency tolerance indication. The RPM may further be configured to provide an aggregate client latency tolerance in response to the plurality of votes. The aggregator may be configured to set each of the micro-idle timers to the associated micro-idle time value in response to the aggregate client latency tolerance. The micro-idle timers may each be configured to determine whether an associated micro-idle time value has elapsed and to apply to a corresponding portion of the subsystem a corresponding power management policy associated with a micro-idle time value determined to have elapsed.

In still another aspect, a computer program product for power management in a subsystem of a portable computing device may include processor-executable instructions embodied in at least one non-transitory storage medium. Execution of the instructions by one or more processors of a system may configure the system to receive a plurality of votes from a corresponding plurality of client devices of the subsystem, and to provide an aggregate client latency tolerance in response to the plurality of votes. Each vote may include a client activity status indication and a client latency tolerance indication. The aggregate client latency tolerance may correspond to a plurality of micro-idle time values associated with a corresponding plurality of micro-idle timers. Execution of the instructions may further configure the system to set each of the micro-idle timers to an associated micro-idle time value in response to the aggregate client latency tolerance. The micro-idle timers determine whether one or more of the micro-idle time values have elapsed, and apply to a portion of the subsystem a corresponding power management policy associated with each micro-idle time value determined to have elapsed.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 4 illustrates a lookup table usable in the system of FIG. 3, in accordance with an exemplary embodiment.

DETAILED DESCRIPTION

Figure 1:
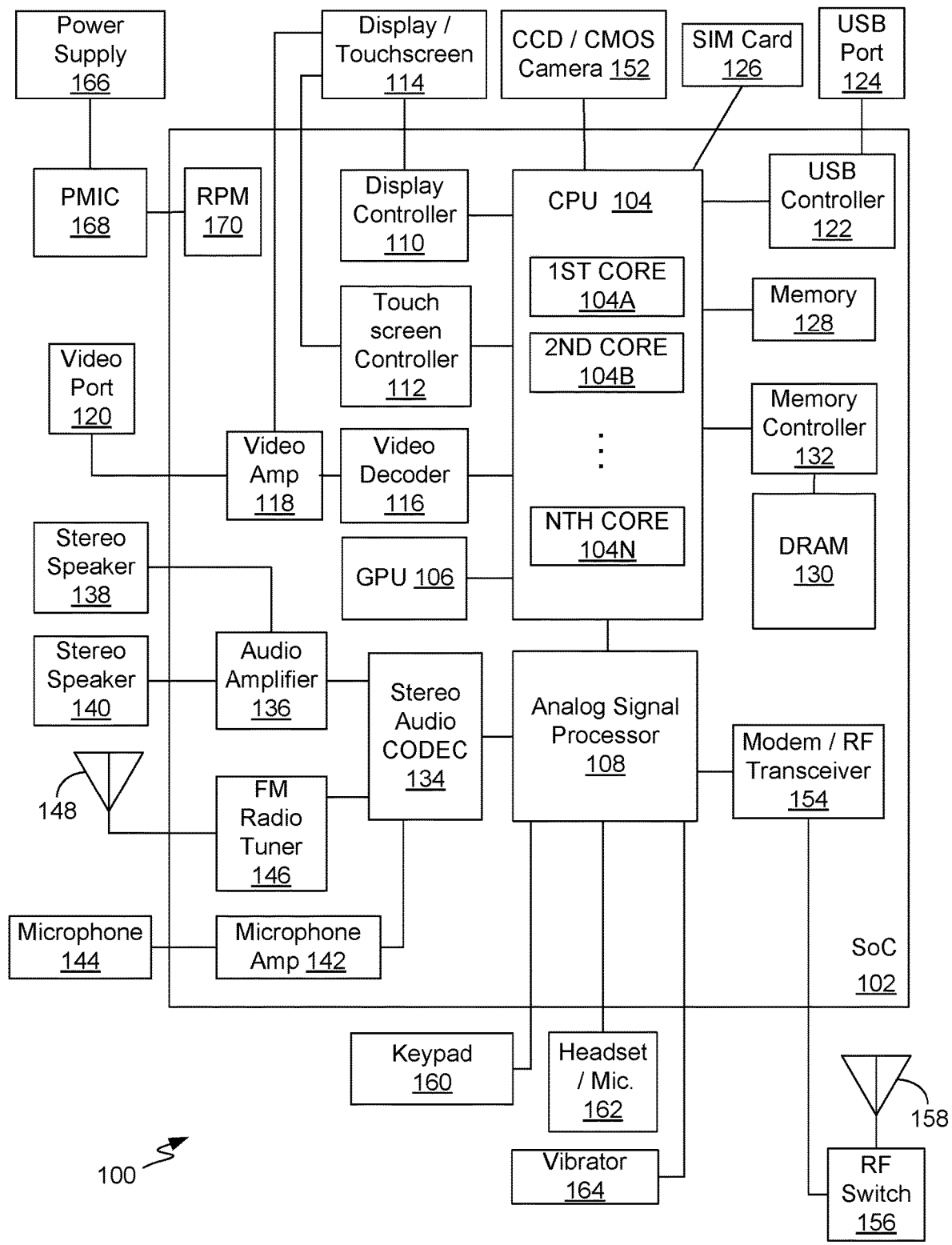
FIG. 1 is a block diagram of a portable computing device, in accordance with an exemplary embodiment.

The word "exemplary" is used herein to mean "serving as an example, instance, or illustration." Any aspect described herein as "exemplary" is not necessarily to be construed as preferred or advantageous over other aspects.

The term "portable computing device" ("PCD") is used herein to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular or mobile telephone, a satellite telephone, a pager, a personal digital assistant ("PDA"), a smartphone, a navigation device, a smartbook or reader, a media player, a combination of the aforementioned devices, or a hand-held computer, laptop, or tablet computer with a wireless connection or link, among others.

The terms "component," "system," "subsystem," "module," "database," and the like are used herein to refer to a computer-related entity, either hardware, firmware, or a combination of hardware and firmware. For example, a component may be, but is not limited to being, a processor of portion thereof, a processor or portion thereof as configured by a program, process, object, thread, executable, etc. A component may be localized on one system and/or distributed between two or more systems.

The terms "application" or "application program" may be used synonymously to refer to a software entity having executable content, such as object code, scripts, byte code, markup language files, patches, etc. In addition, an "application" may further include files that are not executable in nature, such as data files, configuration files, documents, etc.

A reference herein to "DDR" memory components will be understood to encompass any of a broader class of synchronous dynamic random access memory ("SDRAM") and will not limit the scope of the solutions disclosed herein to a specific type or generation of SDRAM. Moreover, certain embodiments of the solutions disclosed herein may be applicable to DDR, DDR-2, DDR-3, low power DDR ("LPDDR") or any subsequent generation of SDRAM.

The terms "central processing unit" ("CPU"), "digital signal processor" ("DSP"), and "graphics processing unit" ("GPU") are non-limiting examples of processors that may reside in a PCD. These terms are used interchangeably herein except where otherwise indicated.

The term "idle" refers to a state in which a subsystem or component is not performing its characteristic operations. For example, a memory subsystem is idle when it is not processing any read or write transactions or performing any memory maintenance operations. When a subsystem or component is not idle, it is "active." "Active power" refers to the amount of power consumed by the subsystem or component when it is active. "Idle power" refers to the amount of power consumed by the subsystem or component when it is idle.

As illustrated in FIG. 1, in illustrative or exemplary embodiments, systems, methods, and computer program products for memory system calibration may be embodied in a PCD 100. PCD 100 includes a system-on-chip ("SoC") 102, i.e., a system comprising a plurality of subsystems or components embodied in an integrated circuit chip. SoC 102 may include a central processing unit ("CPU") 104, a graphics processing unit ("GPU") 106, or other processors. PCD 102 may include an analog signal processor 108. CPU 104 may include multiple cores, such as a first core 104A, a second core 104B, etc., through an Nth core 104N.

A display controller 110 and a touchscreen controller 112 may be coupled to CPU 104. A touchscreen display 114 external to SoC 102 may be coupled to display controller 110 and touchscreen controller 112. PCD 102 may further include a video decoder 116. Video decoder 116 is coupled to CPU 104. A video amplifier 118 may be coupled to video decoder 116 and touchscreen display 114. A video port 120 may be coupled to video amplifier 118. A universal serial bus ("USB") controller 122 may also be coupled to CPU 104, and a USB port 124 may be coupled to USB controller 122. A subscriber identity module ("SIM") card 126 may also be coupled to CPU 104.

One or more memories may be coupled to CPU 104. The one or more memories may include both volatile and non-volatile memories, such as a flash memory 128 and a double data-rate dynamic random access memory ("DDR DRAM" or "DDR") 130, respectively. In other embodiments, additional memory, such as additional DDR, may be included externally to SoC 102. A memory controller 132 coupled to CPU 104 controls the writing of data to, and reading of data from, DDR 130. In other embodiments, such a memory controller may be included within a processor, such as CPU 104.

A stereo audio CODEC 134 may be coupled to analog signal processor 108. Further, an audio amplifier 136 may be coupled to stereo audio CODEC 134. First and second stereo speakers 138 and 140, respectively, may be coupled to audio amplifier 136. In addition, a microphone amplifier 142 may be also coupled to stereo audio CODEC 134, and a microphone 144 may be coupled to microphone amplifier 142. A frequency modulation ("FM") radio tuner 146 may be coupled to stereo audio CODEC 134. An FM antenna 148 may be coupled to the FM radio tuner 146. Further, stereo headphones 150 may be coupled to stereo audio CODEC 134. Other devices that may be coupled to CPU 104 include a digital camera 152.

A modem or radio frequency ("RF") transceiver 154 may be coupled to analog signal processor 108. An RF switch 156 may be coupled to RF transceiver 154 and an antenna 158. In addition, a keypad 160, a mono headset with a microphone 162, and a vibrator device 164 may be coupled to analog signal processor 108.

A power supply 166 may be coupled to SoC 102 via a power management integrated circuit ("PMIC") 168. Power supply 166 may include a rechargeable battery or a DC power supply that is derived from an AC-to-DC transformer connected to an AC power source. A resource power manager ("RPM") 170 coupled to PMIC 168 controls management and distribution of power to various components of SoC 102.

Touch screen display 114, video port 120, USB port 124, camera 152, first stereo speaker 138, second stereo speaker 140, microphone 144, FM antenna 148, RF switch 156, RF antenna 158, keypad 160, headset 162, vibrator 164, PMIC 168, and power supply 166 are external to SoC 102 in this exemplary or illustrative embodiment. It will be understood, however, that in other embodiments one or more of these devices may be included in such an SoC.

RPM 170 periodically receives messages commonly referred to as "votes" from one or more power-consuming components sharing a voltage rail and/or clock domain. A vote broadly indicates, among other things, whether the component anticipates being active or idle (i.e., inactive). RPM 170 aggregates the votes. That is, RPM 170 selects a power state based on the received votes. For example, if RPM 170 determines that all received votes indicate an idle state, RPM 170 may determine that the aggregate power state is idle and accordingly adjust the voltage rail to a low or "collapsed" voltage level and the clock signal to a frequency of zero. This voting, aggregation of votes, and consequent adjustment of voltage levels and clock frequencies may occur multiple times over the course of PCD use, i.e., between PCD initializations. Thus, the durations of aggregate idle states and aggregate active states may vary.

Figure 2:
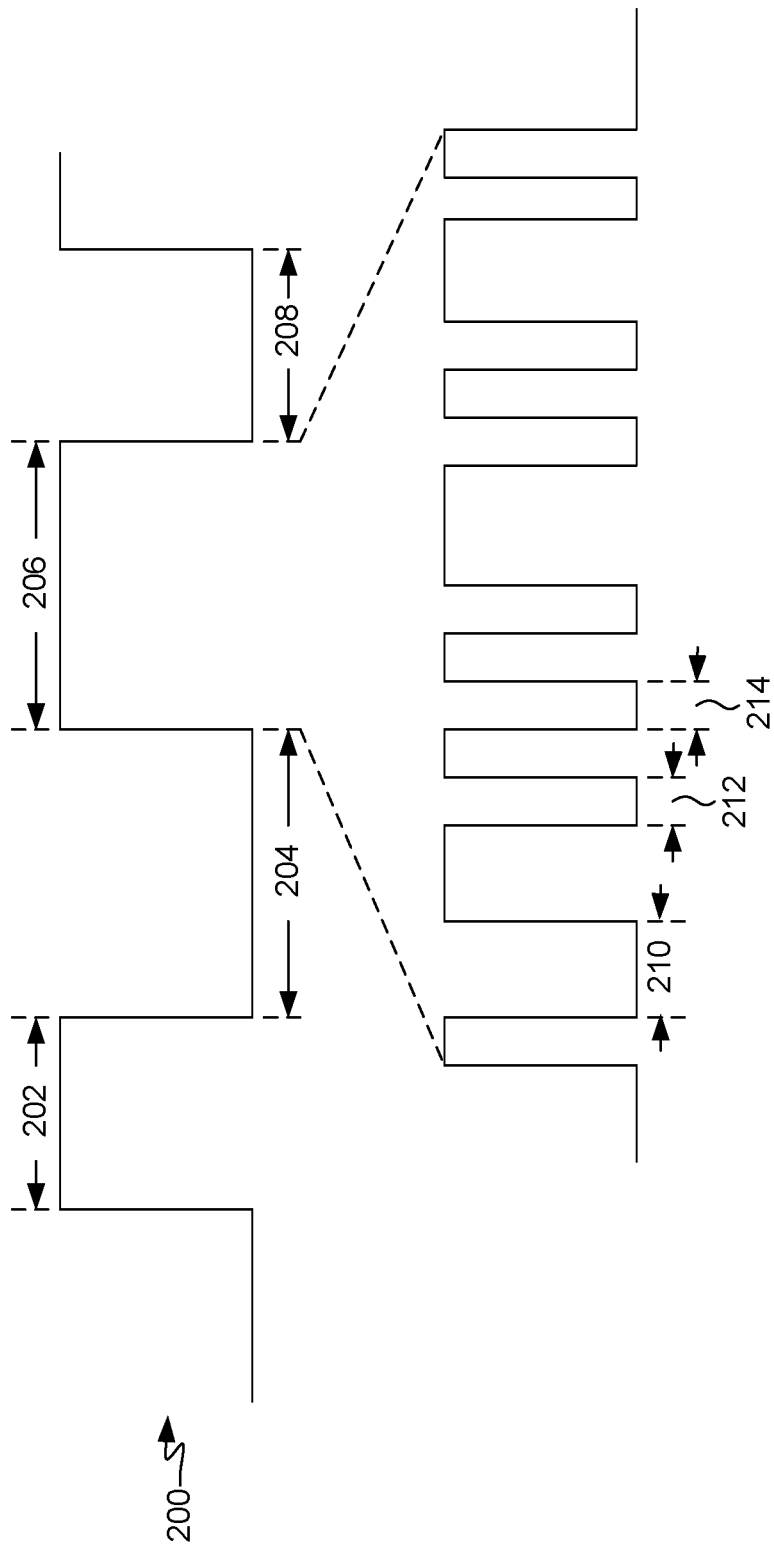
FIG. 2 is a timing diagram conceptually illustrating micro-idle states by way of contrast with macro-idle states, in accordance with an exemplary embodiment.

As illustrated in FIG. 2, an example of the result 200 of RPM 170 aggregating received votes may include an active time period 202, followed by an idle time period 204, followed by another active time period 206, followed by another idle time period 208, etc., all of which may be of various durations. (For purposes of clarity, result 200 is conceptually depicted in a form resembling a single signal but may have any form, such as one or more messages transmitted via one or more buses.) During active time periods 202, 206, etc., RPM 170 may employ DCVS to control the adjustment of voltage levels and clock frequencies supplied to the active components in accordance with the selected power state. During idle time periods 204, 208, etc., RPM 170 may collapse the voltage levels to zero or a minimum (leakage) level. As returning components from an idle power state to an active power incurs a high exit latency penalty, RPM 170 may exercise restraint in selecting the idle power state over alternative (active) power states.

In some circumstances, the set of voting components may be clients of a subsystem, such as a memory subsystem. While the subsystem remains in an active power state or time period, there may be some sub-periods during which one or more of the clients access the subsystem, and other sub-periods during which none of the clients access the subsystem. A technique for reducing subsystem power consumption treats the latter sub-periods as "micro-idle" periods by selectively applying power management policies that reduce power consumption. In the example shown in FIG. 2, active time period 206 may encompass micro-idle periods 210, 212, 214, etc. By way of contrast, idle time periods 204, 208, etc., may also be referred to as "macro-idle" periods.

Figure 3:
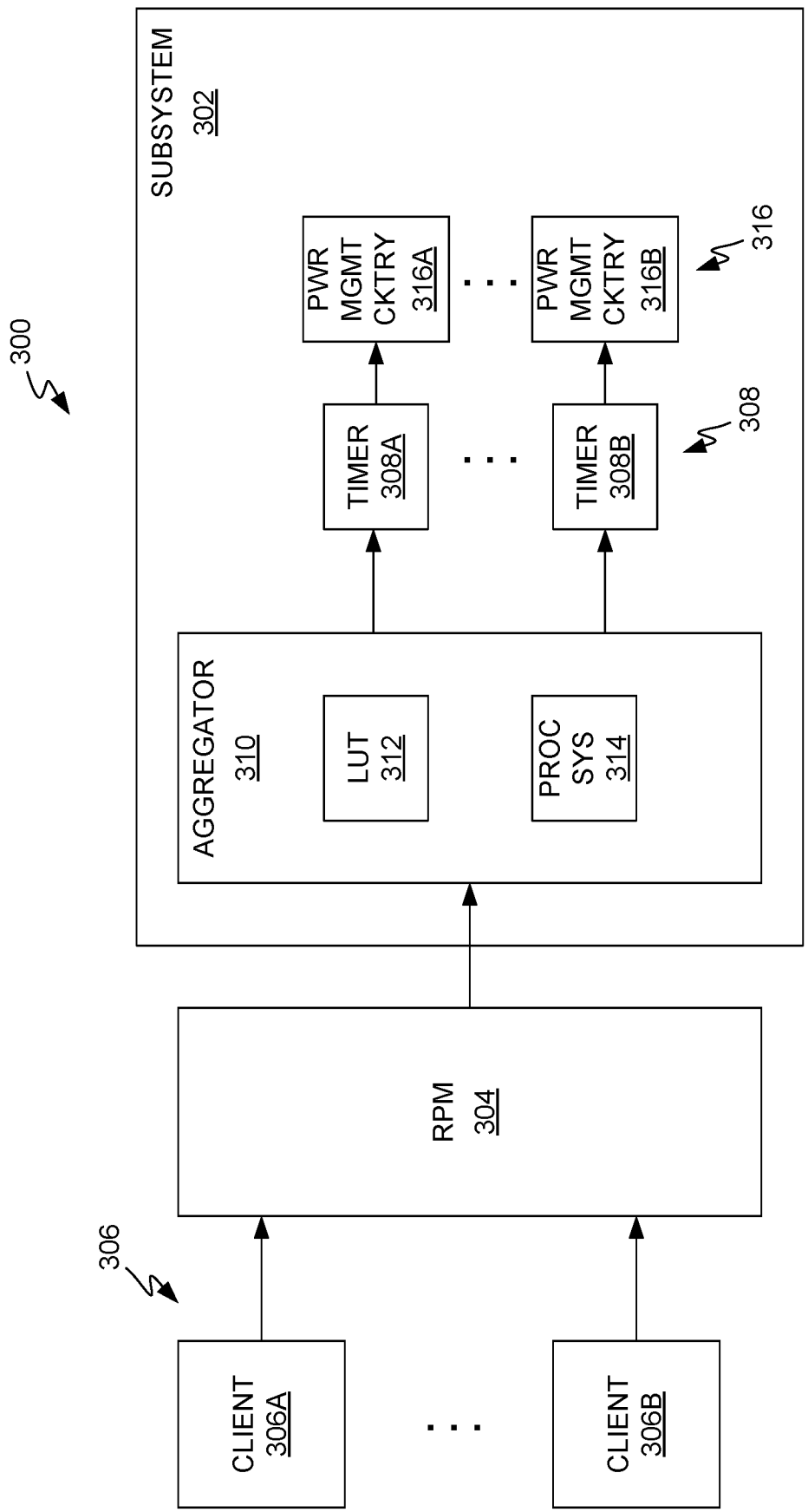
FIG. 3 is a block diagram illustrating a system for power management in a subsystem of a portable computing device, in accordance with an exemplary embodiment.

As illustrated in FIG. 3, an exemplary system 300 includes a subsystem 302, a RPM 304, and a plurality of client components 306 that are clients of subsystem 302. There may be any number of client components 306, including, for example, a client component 306A, a client component 306B, etc. (where the ellipsis symbol (" . . . ") shown between client components 306A and 306B indicates further client components that are not individually shown for purposes of clarity). Although clock signals are not shown for purposes of clarity, client components 306 share at least one clock signal domain with subsystem 302.

The above-described RPM 170 may be an example of RPM 304. The above-described CPU 104 and GPU 106 may be examples of client components 306. Other examples of client components 306 include a modem system and an analog signal processor. RPM 304 periodically receives votes from a set of two or more such client components 306. Each vote includes a client activity status indication and a client latency tolerance indication. As described in further detail below, the client activity status indication and client latency tolerance indication are used in determining power management policies to apply to subsystem 302 or portions thereof during micro-idle periods. Nevertheless, RPM 304 may also use the information represented by the votes in a conventional manner to select power states, including active power states and macro-idle states. Selecting active and macro-idle power states in a conventional manner may provide a coarse degree of power management, while applying power management policies during micro-idle periods may further provide a finer degree of power management.

The client activity status indication indicates whether a client anticipates being active, i.e., whether the client anticipates a need for subsystem clock domain bandwidth. The client latency tolerance indication indicates, for a client anticipating being active, the amount of delay or latency in returning from an idle (or micro-idle) state to an active state that the client can tolerate without adversely impacting the client's performance. In determining its latency tolerance, a client component 306 may take into account a use case, i.e., in what context the client is being used.

RPM 304 aggregates the votes it receives from client components 306. That is, RPM 304 determines an aggregate client latency tolerance in response to the client latency tolerance indications in the received votes. Examples of client latency tolerance aggregation functions include a minimum function or a maximum function. Thus, for example, RPM 304 may determine the minimum client latency tolerance from among all the received votes to be the aggregate client latency tolerance.

The aggregate client latency tolerance corresponds to a plurality of micro-idle time values associated with a corresponding plurality of micro-idle timers 308 in subsystem 302. There may be any number of micro-idle timers 308, including, for example, a micro-idle timer 308A, a micro-idle timer 308B, etc. (where the ellipsis symbol (" . . . ") shown between micro-idle timers 308A and 308B indicates further micro-idle timers 308 that are not individually shown for purposes of clarity). RPM 304 may provide the aggregate client latency tolerance to subsystem 302.

Subsystem 302 includes an aggregator 310 that sets micro-idle timers 308 to the associated micro-idle time values. Aggregator 310 may, for example, obtain the micro-idle time values from a lookup table 312, using the aggregate client latency tolerance as an input to lookup table 312. Aggregator 310 may include a processor system 314 that controls some aspects of the operation of aggregator 310.

RPM 304 may also determine an active client categorization in response to the received votes. An active client categorization indicates to which of a plurality of categories the clients indicating anticipating being active belong, based on the clients' characteristic subsystem bandwidth usage, power consumption, or other aspect of client operation. For example, clients that characteristically flood the subsystem with traffic may be grouped together in one category, while clients whose traffic is characteristically of a high priority may be grouped together in another category, and clients that characteristically consume less power than other clients may be grouped together in still another category. Aggregator 310 may, for example, obtain the micro-idle time values from lookup table 312 using a combination of the aggregate client latency tolerance and the active client categorization as an input to lookup table 312.

Subsystem 302 further includes power management circuitry portions 316. Power management circuitry portions 316 comprise hardware elements that apply power management policies to corresponding portions of subsystem 302. There may be any number of power management circuitry portions 316, including, for example, a power management circuitry portion 316A, a power management circuitry portion 316B, etc. (where the ellipsis symbol (" . . . ") shown between power management circuitry portions 316A and 316B indicates further power management circuitry portions 316 that are not individually shown for purposes of clarity). Each power management circuitry portion 316 is coupled to a corresponding one of micro-idle timers 308.

While subsystem 302 is in an active (i.e., non-macro-idle) state, micro-idle timers 308 are used to determine whether a micro-idle period occurs. While subsystem 302 is in an active state, each of micro-idle timers 308 times the durations in which subsystem 302 is not operating, i.e., idle. For example, each of micro-idle timers 308, which has been loaded with an associated micro-idle time value, may count down from the loaded value and issue a timeout signal when the count reaches zero, indicating that the micro-idle time value has elapsed. Alternatively, in other embodiments micro-idle timers 308 may count up from zero until they reach the micro-idle time value. In any case, regardless of the counting mechanism employed, micro-idle timers 308 count the micro-idle timer value until it elapses or subsystem 302 resumes operating, whichever occurs first. If subsystem 302 resumes operating while one or more micro-idle timers 308 are counting, all micro-idle timers 308 are reset, and micro-idle timers 308 again begin counting their corresponding micro-idle time values.

In response to a timeout signal from one of micro-idle timers 308 indicating elapse of a micro-idle time value, the corresponding power management circuitry portion 316 applies a corresponding power management policy to a portion of subsystem 302. Examples of power management policies may include: turning off one or more of circuitry blocks; turning off a clock driver; and gating one or more clock signals. Each power management policy may be associated with one of the power management circuitry portions 316.

As illustrated in FIG. 4, the aggregate client latency may be represented by, for example, a numeric active latency code ("ALC") that is used as an input to a lookup table ("LUT") 400. Lookup table 400 may be an example of above-described lookup table 312 (FIG. 3). Columns of LUT 400 list all the micro-idle timers 308 in columns labeled "first timer," "second timer," "third timer," etc., through "Nth timer." (The terms "first," "second," "third," etc., are used for convenience of description and do not indicate order or any other characteristic.) Each row of LUT 400 is indexed by an ALC value. Although not shown for purposes of clarity, the above-described active client categorization may be used in combination with the ALC to provide an input to lookup table 400. The cells of LUT 400 (where each cell is indexed by the combination of one row and one column) are configured to contain the above-described micro-idle time values. Thus, in response to the ALC, or a combination of the ALC and the active client categorization, LUT 400 may provide a set of micro-idle time values corresponding to a set or subset of micro-idle timers 308. The number of micro-idle time values obtained from LUT 400 may be less than the number of micro-idle timers 308. That is, a cell may contain a null value, indicating that the corresponding micro-idle timer 308 is to be disregarded. In the manner described above with regard to FIG. 3, aggregator 310 may apply the ALC to LUT 400 to obtain such a set of micro-idle time values, and control the loading of those values into the corresponding micro-idle timers 308.

Following the loading of micro-idle timers with the micro-time values obtained from LUT 400, one or more power management policies may be applied to subsystem 302 in response to the elapse of one or more of the micro-time values. As the micro-idle time values may differ from each other, they may elapse successively. That is, the elapse of one micro-idle time value may follow the elapse of another micro-idle time value. As successive micro-idle time values elapse, subsystem 302 is placed into successively deeper (i.e., lower power consumption) power states. If subsystem 302 resumes operating before all micro-idle time values have elapsed, all micro-idle timers 308 are reset, and (unless they are immediately reset again by further operation of subsystem 302) micro-idle timers 308 begin counting again. If subsystem 302 does not resume operating before all micro-idle time values have elapsed, the elapse of the last micro-idle time value places subsystem 302 into the deepest power state that can be achieved in response to the corresponding ALC. In that event, subsystem 302 remains in that deepest power state until such time as it resumes operating.

It may be noted that the deepest power state that can be achieved in response to a corresponding ALC has an associated exit latency penalty. LUT 400 may be organized, for example, such that an increase in ALC is in direct relation to an increase in exit latency penalty and in inverse relation to an increase in power savings (or stated conversely, a decrease in power consumption). Thus, in a LUT 400 having, for example, 16 rows corresponding to an ALC between 0 and 15, inclusive, rows may be organized such an the ALC of "0" indexing the first row corresponds to the lowest exit latency penalty, and an ALC of "15" indexing the last row represents the highest exit latency penalty. The exit latency penalties may, for example, increase monotonically from lowest to highest through the rows of LUT 400 to simplify voting by clients 306.

Figure 5:
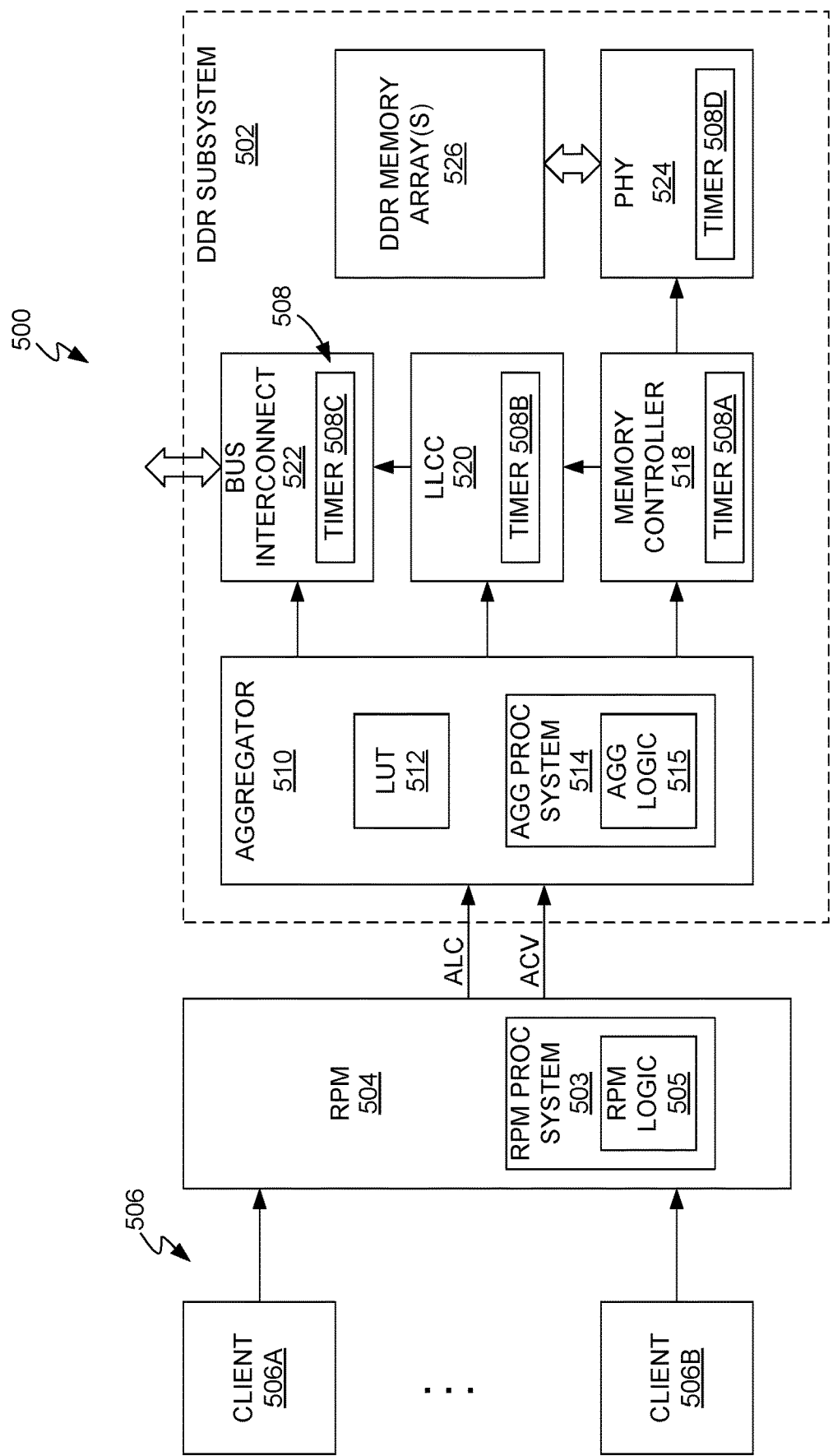
FIG. 5 is a block diagram illustrating a system for power management in a DDR subsystem of a portable computing device, in accordance with an exemplary embodiment.

As illustrated in FIG. 5, a system 500 includes a DDR subsystem 502. System 500 further includes an RPM 504 and a plurality of client components 506. In the illustrated example, client components 506 are clients of DDR subsystem 502. Client components 506 may include any PCD component that may access DDR subsystem 502, i.e., issue write requests to store data in DDR subsystem 502 or read requests to retrieve data from DDR subsystem 502. There may be any number of client components 506, including, for example, a client component 506A, a client component 506B, etc. (where the ellipsis symbol (" . . . ") shown between client components 506A and 506B indicates further client components 506 that are not individually shown for purposes of clarity). Although clock signals are not shown for purposes of clarity, client components 506 share at least one clock signal domain with DDR subsystem 502.

RPM 504 may include an RPM processor system 503 that controls some aspects of the operation of RPM 504. RPM processor system 502 comprises RPM logic 505, such as a processor and memory configured with software, firmware, or similar form of processor-executable instructions. The combination of such instructions and the memory in which the instructions are stored or otherwise reside in non-transitory, computer-executable form, comprises a "computer program product" or portion thereof, as that term is understood in the patent lexicon.

RPM 504 periodically receives votes from a set of two or more of client components 506. The votes may be similar to the votes described above with regard to FIG. 3, and RPM 504 may aggregate the votes in the same manner described above with regard to RPM 304. DDR subsystem 502 includes an aggregator 510, which may obtain micro-idle time values from a LUT 512, using the aggregate client latency tolerance received from RPM 504 as an input to LUT 512. Alternatively, or in addition, aggregator 510 may use a combination of the aggregate client latency tolerance and an active client categorization received from RPM 504 as an input to LUT 512. As described above with regard to FIG. 3, RPM 504 may provide the aggregate client latency tolerance to aggregator 510 in the form of an active latency code ("ALC").

RPM 504 may provide the active client categorization to aggregator 510 in the form of an active client vector ("ACV"). For example, the ACV may be a 5-bit word, in which each bit position represents a category of client. A "1" bit in any of the bit positions indicates that at least one voting client belongs to the category represented by that bit position. A "0" bit in any of the bit positions indicates that no voting clients belong to the category represented by that bit position.

Aggregator 510 may include an aggregator processor system 514 that controls some aspects of the operation of aggregator 510. Aggregator processor system 514 comprises aggregator logic 515, such as a processor and memory configured with software, firmware, or similar form of processor-executable instructions. The combination of such instructions and the memory in which the instructions are stored or otherwise reside in non-transitory, computer-executable form, comprises a computer program product or portion thereof.

Aggregator 510 may control setting micro-idle timers 508A, 508B, 508C, 508D, etc. (collectively referred to as micro-idle timers 508) in subsystem 502 to the corresponding micro-idle time values. Micro-idle timer 508A may be included in or otherwise associated with, for example, a memory controller 518 of DDR subsystem 502. Micro-idle timer 508B may be included in or otherwise associated with, for example, a lowest-level cache controller ("LLCC") 520 of DDR subsystem 502. Micro-idle timer 508C may be included in or otherwise associated with, for example, a bus interconnect 522 of DDR subsystem 502. Micro-idle timer 508D may be included in or otherwise associated with, for example, a physical layer control interface 524 of DDR subsystem 502. Memory controller 518, LLCC 520, bus interconnect 522, and physical layer control interface 524 serve as examples of portions of subsystem 502 to which power management policies may be applied. The corresponding power management circuitry portions that apply the power management policies, such as clock gating circuits, etc., are not shown in FIG. 5 for purposes of clarity but may be similar to power management circuitry portions 316 described above with regard to FIG. 3. The timeout signal outputs of micro-idle timers 508 are coupled to such power management circuitry portions in the manner described above with regard to FIG. 3.

Physical layer control interface 524 interfaces one or more DDR memory arrays 526 with memory controller 518. In addition to the features specifically described in this disclosure, DDR subsystem 502 may include any conventional features, such as features commonly included in memory systems. Similarly, although not shown for purposes of clarity, it should be understood that bus interconnect 522 provides the data and control bus interconnections that interconnect DDR subsystem 502 with client components 506. It should be understood that the arrows shown in FIGS. 3 and 5 depict flows of information in a conceptual manner, while bus interconnect 522 or other buses, interconnects, fabrics, signal lines, etc., correspondingly transport such information in the form of electronic signals, messages, data packets, etc., in accordance with various protocols.

While DDR subsystem 502 is in an active non-macroidle) state, micro-idle timers 508 are used to determine whether micro-idle periods occur. While DDR subsystem 502 is in an active state, each of micro-idle timers 508 times the durations in which subsystem 502 is not operating, i.e., idle. Operation of DDR subsystem 502 may include servicing a read request or write request, and performing memory maintenance operations. Each of micro-idle timers 308 counts until its micro-idle timer value elapses or subsystem 502 resumes operating, whichever occurs first. For example, each of micro-idle timers 308 may count until such time as a new read request or write request may be pending in DDR subsystem 502, at which time all micro-idle timers 508 are reset in response to such resumed operation, and micro-idle timers 508 again begin counting. Stated another way, each of micro-idle timers 508 counts until its micro-idle time value elapses or, while the micro-idle time value has not elapsed, until a read request or write request is pending in DDR subsystem 502 or DDR subsystem 502 is in the process of performing a read or write operation, memory maintenance operation, or similar operation that is characteristic of such a memory system.

In response to a timeout signal from one of micro-idle timers 508 indicating elapse of a micro-idle time value, the corresponding power management policy is applied to a portion of DDR subsystem 502. For example, in response to a signal from micro-idle timer 508A indicating elapse of the corresponding micro-idle time value, the corresponding power management policy is applied to memory controller 518; in response to a signal from micro-idle timer 5089 indicating elapse of the corresponding micro-idle time value, the corresponding power management policy is applied to LLCC 520; in response to a signal from micro-idle timer 508C indicating elapse of the corresponding micro-idle time value, the corresponding power management policy is applied to bus interconnect 522; and in response to a signal from micro-idle timer 508D indicating elapse of the corresponding micro-idle time value, the corresponding power management policy is applied to physical layer control interface 524.

Figure 6:
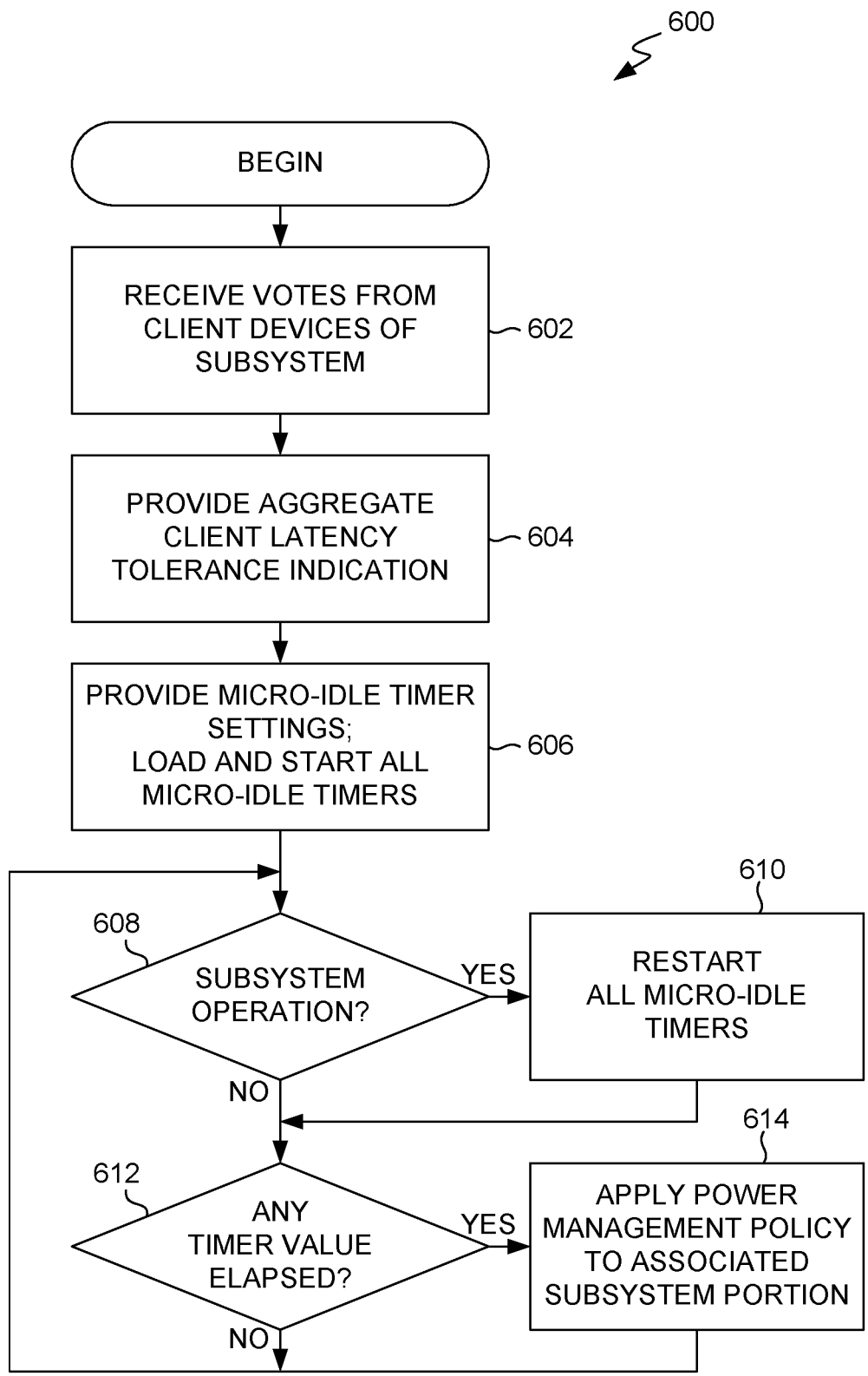
FIG. 6 is a flow diagram illustrating a method for power management in a subsystem of a portable computing device, in accordance with an exemplary embodiment.

In exemplary embodiments the above-described systems 300, 500 or similar systems may operate in the manner illustrated by the flow diagram of FIG. 6. Although certain acts or steps in the methods described below naturally precede others for the exemplary embodiments to operate as described, the invention is not limited to the order of those acts or steps if such order or sequence does not alter the functionality of the invention. That is, it is recognized that some acts or steps may be performed before, after, or in parallel (i.e., substantially simultaneously) with other acts or steps without departing from the scope and spirit of the invention. In some instances, certain acts or steps may be omitted or not performed, without departing from the scope and spirit of the invention. Further, words such as "thereafter," "then," "next," etc., are not intended to limit the order of the acts or steps. Rather, such words are used to aid in guiding the reader through the descriptions of the exemplary methods.

The method 600 generally relates to power management in a subsystem of a portable computing device. As indicated by block 602, an RPM may receive a plurality of votes from a corresponding plurality of client devices of the subsystem. Each vote may include a client activity status indication and a client latency tolerance indication. An RPM thus may serve as a means for receiving a plurality of votes.

As indicated by block 604, the RPM may provide an aggregate client latency tolerance indication in response to the plurality of votes. The aggregate client latency tolerance indication corresponds to a plurality of micro-idle time values associated with a corresponding plurality of micro-idle timers. The micro-idle time values may be obtained, for example, from a lookup table using the aggregate client latency tolerance as an input to the lookup table. The RPM may also provide an active client categorization indication in response to the plurality of votes. The active client categorization indication may be used in combination with the aggregate client latency tolerance to obtain the micro-idle time values. Each micro-idle time value corresponds to, or is associated with, a micro-idle timer. Each micro-idle timer corresponds to, or is associated with, a power management policy. An RPM thus may serve as a means for providing an aggregate client latency tolerance As indicated by block 606, each of the micro-idle timers may be set to an associated micro-idle time value in response to the aggregate client latency tolerance. The micro-idle timers count or otherwise measure elapsed time. For example, each micro-idle timer may be loaded with the associated micro-idle time value and then begin counting down. An aggregator may serve as a means for setting each of the micro-idle timers to an associated micro-idle time value.

As indicated by block 608, it is determined whether the subsystem is performing or is imminently to perform an operation, e.g., due to a pending request. The operation may be of any type that is characteristic of a subsystem of that type. For example, memory transactions, such as read, write, and memory maintenance operations are characteristic of a memory subsystem.

If it is determined (block 608) that the subsystem is performing or is imminently to perform an operation, all micro-idle timers are reset and begin counting or otherwise timing again, as indicated by block 610. Whether a micro-idle state occurs is determined with respect to each micro-idle time value and thus with respect to each corresponding power management policy. Thus, if the subsystem performs an operation before a first micro-idle time value elapses, a micro-idle state is determined not to have occurred from the perspective of a first power management policy. In contrast, if the subsystem does not perform an operation before a second micro-idle time value elapses, a micro-idle state is determined to have occurred from the perspective of a second power management policy. Stated another way, at any point in time it may have been determined in accordance with one or more power management policies that a micro-idle state has occurred, while at the same time it may been determined in accordance with one or more other power management policies that a micro-idle state has not yet occurred. The micro-idle time values used in these determinations may be adjusted, based on client voting, at essentially any time during PCD operation.

As indicated by block 612, it is determined whether one or more of the micro-idle time values has elapsed. If the subsystem is not performing or imminently to perform an operation, and none of the micro-idle time values have elapsed, then the subsystem continues monitoring for such events. However, if it is determined that one or more of the micro-idle time values has elapsed, then the corresponding power management policies are applied to the associated portions of the subsystem, as indicated by block 614. The micro-idle timers may serve as means for determining whether one or more of the micro-idle time values have elapsed. Power management circuitry may serve as means for applying to a portion of the subsystem a corresponding power management policy associated with each micro-idle time value determined to have elapsed.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for power management in a subsystem of a portable computing device, comprising:
    receiving a plurality of votes from a corresponding plurality of client devices of the subsystem, each vote including a client activity status indication and a client latency tolerance indication;
    providing an aggregate client latency tolerance in response to the plurality of votes, the aggregate client latency tolerance corresponding to a plurality of micro-idle time values associated with a corresponding plurality of micro-idle timers, each micro-idle timer associated with a different hardware device of the subsystem, the subsystem comprising a plurality of different hardware devices, each hardware device supports a separate and different operation within the subsystem;
    setting each of the micro-idle timers to an associated micro-idle time value in response to the aggregate client latency tolerance;
    determining, using the micro-idle timers, whether one or more of the micro-idle time values have elapsed; and
    applying to a portion of the subsystem a corresponding power management policy associated with each micro-idle time value determined to have elapsed.

2. The method of claim 1, wherein the subsystem is a memory subsystem, and the client devices are memory clients.

3. The method of claim 1, wherein each micro-idle timer is reset in response to a memory transaction.

4. The method of claim 1, wherein each micro-idle timer corresponds to a different power management policy and a different power management policy exit penalty.

5. The method of claim 1, further comprising providing an active client categorization indication in response to the plurality of votes.

6. The method of claim 5, wherein setting each of the micro-idle timers to an associated micro-idle time value comprises:
applying the aggregate client latency tolerance indication to the lookup table; and
obtaining the micro-idle time values from the lookup table in response to the aggregate client latency tolerance indication.

7. The method of claim 6, further comprising:
providing an active client categorization indication in response to the plurality of votes; and
applying a combination of the aggregate client latency tolerance and the active client categorization indication to the lookup table,
wherein the micro-idle time values are obtained from the lookup table in response to the a combination of the aggregate client latency tolerance and the active client categorization indication.

8. The method of claim 1, wherein the aggregate client latency tolerance represents a minimum client latency tolerance among the plurality of votes.

9. The method of claim 1, wherein the portable computing device comprises one of a mobile telephone, a personal digital assistant, a pager, a smartphone, a navigation device, and a hand-held computer with a wireless link.

10. A system for power management in a portable computing device, comprising:
a resource power manager ("RPM") configured to receive a plurality of votes from a corresponding plurality of client devices of a subsystem of the portable computing device, each vote including a client activity status indication and a client latency tolerance indication, the RPM further configured to providing an aggregate client latency tolerance in response to the plurality of votes;
a plurality of micro-idle timers, each configured to determine whether an associated micro-idle time value has elapsed and to apply to a corresponding portion of the subsystem a corresponding power management policy associated with a micro-idle time value determined to have elapsed, each micro-idle timer associated with a different hardware device of the subsystem, the subsystem comprising a plurality of different hardware devices, each hardware device supports a separate and different operation within the subsystem; and
an aggregator configured to set each of the micro-idle timers to the associated micro-idle time value in response to the aggregate client latency tolerance.

11. The system of claim 10, wherein the subsystem is a memory subsystem, and the client devices are memory clients.

12. The system of claim 10, wherein each micro-idle timer is reset in response to a memory transaction.

13. The system of claim 10, wherein each micro-idle timer corresponds to a different power management policy and a different power management policy exit penalty.

14. The system of claim 10, further comprising providing an active client categorization indication in response to the plurality of votes.

15. The system of claim 14, wherein setting each of the micro-idle timers to an associated micro-idle time value comprises:
applying the aggregate client latency tolerance indication to the lookup table; and
obtaining the micro-idle time values from the lookup table in response to the aggregate client latency tolerance indication.

16. The system of claim 15, further comprising:
providing an active client categorization indication in response to the plurality of votes; and
applying a combination of the aggregate client latency tolerance and the active client categorization indication to the lookup table,
wherein the micro-idle time values are obtained from the lookup table in response to the a combination of the aggregate client latency tolerance and the active client categorization indication.

17. The system of claim 10, wherein the aggregate client latency tolerance represents a minimum client latency tolerance among the plurality of votes.

18. The system of claim 10, wherein the portable computing device comprises one of a mobile telephone, a personal digital assistant, a pager; a smartphone, a navigation device, and a hand-held computer with a wireless link.

19. A computer program product for power management in a subsystem of a portable computing device, the computer program product comprising processor-executable instructions embodied in at least one non-transitory storage medium, execution of the instructions by one or more processors of a system configuring the system to:
receiving a plurality of votes from a corresponding plurality of client devices of the subsystem, each vote including a client activity status indication and a client latency tolerance indication;
providing an aggregate client latency tolerance in response to the plurality of votes, the aggregate client latency tolerance corresponding to a plurality of micro-idle time values associated with a corresponding plurality of micro-idle timers, each micro-idle timer associated with a different hardware device of the subsystem, the subsystem comprising a plurality of different hardware devices, each hardware device supports a separate and different operation within the subsystem; and
setting each of the micro-idle timers to an associated micro-idle time value in response to the aggregate client latency tolerance, wherein the micro-idle timers determine whether one or more of the micro-idle time values have elapsed and apply to a portion of the subsystem a corresponding power management policy associated with each micro-idle time value determined to have elapsed.

20. The computer program product of claim 19, wherein the subsystem is a memory subsystem, and the client devices are memory clients.

21. The computer program product of claim 19, wherein each micro-idle timer is reset in response to a memory transaction.

22. The computer program product of claim 19, wherein each micro-idle timer corresponds to a different power management policy and a different power management policy exit penalty.

23. The computer program product of claim 19, wherein execution of the instructions further configures the system to provide an active client categorization indication in response to the plurality of votes.

24. The computer program product of claim 23, wherein setting each of the micro-idle timers to an associated micro-idle time value comprises:
   applying the aggregate client latency tolerance indication to the lookup table; and
   obtaining the micro-idle time values from the lookup table in response to the aggregate client latency tolerance indication.

25. The computer program product of claim 24, wherein execution of the instructions further configures the system to:
   providing an active client categorization indication in response to the plurality of votes; and
   applying a combination of the aggregate client latency tolerance and the active client categorization indication to the lookup table,
   wherein the micro-idle time values are obtained from the lookup table in response to the a combination of the aggregate client latency tolerance and the active client categorization indication.

26. The computer program product of claim 19, wherein the aggregate client latency tolerance represents a minimum client latency tolerance among the plurality of votes.

27. A system for power management in a subsystem of a portable computing device, the system comprising:
   means for receiving a plurality of votes from a corresponding plurality of client devices of the subsystem, each vote including a client activity status indication and a client latency tolerance indication;
   means for providing an aggregate client latency tolerance in response to the plurality of votes, the aggregate client latency tolerance corresponding to a plurality of micro-idle time values associated with a corresponding plurality of micro-idle timers, each micro-idle timer associated with a different hardware device of the subsystem, the subsystem comprising a plurality of different hardware devices, each hardware device supports a separate and different operation within the subsystem;
   means for setting each of the micro-idle timers to an associated micro-idle time value in response to the aggregate client latency tolerance;
   means for determining, using the micro-idle timers, whether one or more of the micro-idle time values have elapsed; and
   means for applying to a portion of the subsystem a corresponding power management policy associated with each micro-idle time value determined to have elapsed.

28. The system of claim 27, wherein the subsystem is a memory subsystem, and the client devices are memory clients.

29. The system of claim 28, wherein each micro-idle timer is reset in response to a memory transaction.

30. The system of claim 29, wherein each micro-idle timer corresponds to a different power management policy and a different power management policy exit penalty.

* * * * *